(12) United States Patent
Maki et al.

(10) Patent No.: US 7,758,946 B2
(45) Date of Patent: Jul. 20, 2010

(54) THREE-DIMENSIONAL FIBER STRUCTURE, COMPOSITE, AND METHOD FOR MANUFACTURING THREE-DIMENSIONAL FIBER STRUCTURE

(75) Inventors: Aya Maki, Kariya (JP); Ryuta Kamiya, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 516 days.

(21) Appl. No.: 11/731,390

(22) Filed: Mar. 30, 2007

(65) Prior Publication Data
US 2007/0232171 A1    Oct. 4, 2007

(30) Foreign Application Priority Data
Mar. 31, 2006  (JP) .............................. 2006-100565
May 24, 2006  (JP) .............................. 2006-144507

(51) Int. Cl.
*B32B 5/12* (2006.01)
(52) U.S. Cl. .................. 428/113; 428/102; 428/111; 428/223; 442/205; 442/251; 442/252; 442/253
(58) Field of Classification Search ................ 442/205, 442/206, 207, 239, 248–254; 428/111, 902, 428/113, 175, 223, 102, 105; 139/384 R
See application file for complete search history.

(56) References Cited
U.S. PATENT DOCUMENTS
4,410,577 A    10/1983   Palmer et al.
5,100,713 A *  3/1992   Homma et al. .............. 428/102
5,211,967 A    5/1993   Yasui et al.
5,543,005 A    8/1996   Monget et al.
6,123,043 A    9/2000   Cahuzac

FOREIGN PATENT DOCUMENTS
JP    2-191742    7/1990
JP    9-137336    5/1997

OTHER PUBLICATIONS

Machine translation of Yasui, JP 09-137336, retrieved on Oct. 31, 2009.*
European Search Report dated Jul. 6, 2007 issued by European Patent Office for application No. EP 07 10 5193.

* cited by examiner

*Primary Examiner*—David R Sample
*Assistant Examiner*—Walter Moore
(74) *Attorney, Agent, or Firm*—Locke Lord Bissell & Liddell, LLP

(57) ABSTRACT

A fiber lamination includes a plurality of fiber layers laminated on one another. The fiber layers are at least biaxially oriented. The fiber lamination is a three-dimensional plate. The fiber lamination includes a bent portion, a first flat portion, and a second flat portion. The angle at which a connection yarn crosses the fiber layers at the first flat portion differs from the angle at which the connection yarn crosses the fiber layers at the second flat portion. Therefore, a three-dimensional fiber structure is manufactured by bending a laminated body while suppressing generation of wrinkles and distortion at the bent portion.

7 Claims, 5 Drawing Sheets

THREE-DIMENSIONAL FIBER STRUCTURE, COMPOSITE, AND METHOD FOR MANUFACTURING THREE-DIMENSIONAL FIBER STRUCTURE

BACKGROUND OF THE INVENTION

The present invention relates to a three-dimensional fiber structure including a bent portion, a composite, and a method for manufacturing the three-dimensional fiber structure.

Fiber-reinforced composites (hereinafter, simply referred to as composites) have been widely used as lightweight structural materials. Three-dimensional fiber structures such as three-dimensional fabrics are used as reinforced base materials for composites. The three-dimensional fiber structures are required not to be a simple flat plate but have bent portions to be versatile as reinforcing materials included in composites.

Japanese Laid-Open Patent Publication No. 2-191742 proposes a technique for forming a group of warp by providing a number of warps in rows and columns in a stretched state so as to correspond to the cross-sectional shape of a three-dimensional fabric. A first weft is inserted between the columns of the group of warps, and a second weft is inserted between the rows of the group of warps. This process is repeated. The first weft and the second weft are perpendicular to the warps. As a result, the three-dimensional fabric is woven. When weaving a bent portion of the three-dimensional fabric, the first weft is partially folded back before reaching the warp of the row corresponding to the inner most layer of the bent portion. In a weaving process, the number of the rows to which the second weft is inserted is reduced in accordance with the first weft. As weaving proceeds, the woven part of the three-dimensional fabric is sequentially bent.

Japanese Laid-Open Patent Publication No. 9-137336 proposes a method for manufacturing a three-dimensional fiber structure using a frame. The shape of the frame corresponds to the shape of the three-dimensional fiber structure. The frame has a number of restricting members arranged at a predetermined pitch. The three-dimensional fiber structure includes plate-like portions and a connecting portion, which connects the plate-like portions such that the plate-like portions form a bent state. A yarn, that is, a continuous fiber is arranged folded back between the restricting members to form a laminated fiber group including fiber layers laminated on the frame. A connection yarn is inserted in the laminated fiber group retained by the frame.

However, a manufacturing apparatus used in the manufacturing method disclosed in Japanese Laid-Open Patent Publication No. 2-191742 needs to be a three-dimensional weaving machine. Therefore, the apparatus is complicated and large.

An apparatus used in the manufacturing method disclosed in Japanese Laid-Open Patent Publication No. 9-137336 is relatively simple as compared to the apparatus used in the method disclosed in Japanese Laid-Open Patent Publication No. 2-191742. However, according to the manufacturing method disclosed in Japanese Laid-Open Patent Publication No. 9-137336, a process of inserting the connection yarn into the laminated fiber group arranged on the frame in a bent state is increased. The apparatus is also complicated.

The manufacturing method disclosed in Japanese Laid-Open Patent Publication No. 9-137336, which uses the frame having the restricting members, cannot manufacture a three-dimensional fiber structure that includes bent portions that are bent in different directions. This is because the continuous fiber is arranged in a state engaged with the restricting members.

Thus, a laminated body is formed by, first, laminating fiber layers made by continuous fibers. The three-dimensional fiber structure is formed by binding the laminated body with the connection yarn. Thereafter, the three-dimensional fiber structure may be bent to finally form the three-dimensional fiber structure having a bent portion.

A three-dimensional fiber structure 61 having a hat-like cross-section shown in FIG. 9 may be manufactured by the following procedure. That is, at least biaxial flat laminated body 62 is formed by laminating fiber layers formed by continuous fibers. The laminated body 62 is bound by the connection yarn 63 to form a flat three-dimensional fiber structure. By bending the flat three-dimensional fiber structure, the three-dimensional fiber structure 61 having a hat-like cross-section is manufactured.

However, the elongation properties of the continuous fiber used in the three-dimensional fiber structure is generally very low. Therefore, the continuous fiber arranged at the outer section of the bent portion does not stretch. As a result, wrinkles 64 and distortion are generated inside the three-dimensional fiber structure 61. When the composite (FRP) includes a reinforcing material formed of the three-dimensional fiber structure 61 and a resin matrix, the wrinkles 64 and distortion cause degradation of the physical properties of the composite such as degradation of strength. The wrinkles 64 and distortion degrade the external appearance quality of the composite.

SUMMARY OF THE INVENTION

Accordingly, it is an objective of the present invention to provide a three-dimensional fiber structure manufactured by bending a laminated body while suppressing generation of wrinkles and distortion at the bent portion. It is also an objective of the present invention to provide a composite including a reinforcing material formed of the three-dimensional fiber structure. Another objective of the present invention to provide a method for manufacturing the three-dimensional fiber structure.

According to one aspect of the invention, a three-dimensional fiber structure is provided. A fiber lamination includes a plurality of fiber layers laminated on one another. The fiber layers are at least biaxially oriented. Each fiber layer includes a continuous fiber or a fabric texture. The fiber lamination is a three-dimensional plate. The fiber lamination includes a bent portion, a first flat portion, and a second flat portion. The first flat portion and the second flat portion sandwiching the bent portion. The first flat portion, the bent portion, and the second flat portion are continuous with one another. A connection yarn is arranged to cross the fiber layers. The angle at which the connection yarn crosses the fiber layers at the first flat portion differs from the angle at which the connection yarn crosses the fiber layers at the second flat portion.

According to another aspect of the invention, a method for manufacturing a three-dimensional fiber structure is provided. The method includes a continuous fiber arranging process for forming a plurality of fiber layers by arranging a continuous fiber on a jig. The jig includes a plurality of restricting members arranged at a predetermined pitch. The continuous fiber is arranged between the restricting members. The continuous fiber engages each restricting member so that the continuous fiber is folded back. The fiber layers are laminated such that the fiber layers are at least biaxially oriented, and as a result, a fiber lamination is formed. The method includes a connection yarn inserting process for forming a flat primary structure by inserting the connection yarn into the fiber lamination. The connection yarn crosses the fiber lamination. The method includes a bending process for forming two bent portions, which are bent in different directions from each other, on the primary structure, as a result, the fiber lamination is formed into a three-dimensional plate. The three-dimensional plate includes a flat portion located between the bent portions. The flat portion is adjacent to the bent portions. The bent portions are continuous with the flat portion. The connection yarn crosses the fiber layers. The primary structure includes a section that will be the flat portion at least after the bending process. In the connection yarn inserting process, the connection yarn is inserted in the section such that the length of the connection yarn is longer than the thickness of the flat portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

A first embodiment of the present invention will now be described with reference to FIGS. 1A to 4B.

Figure 1A:
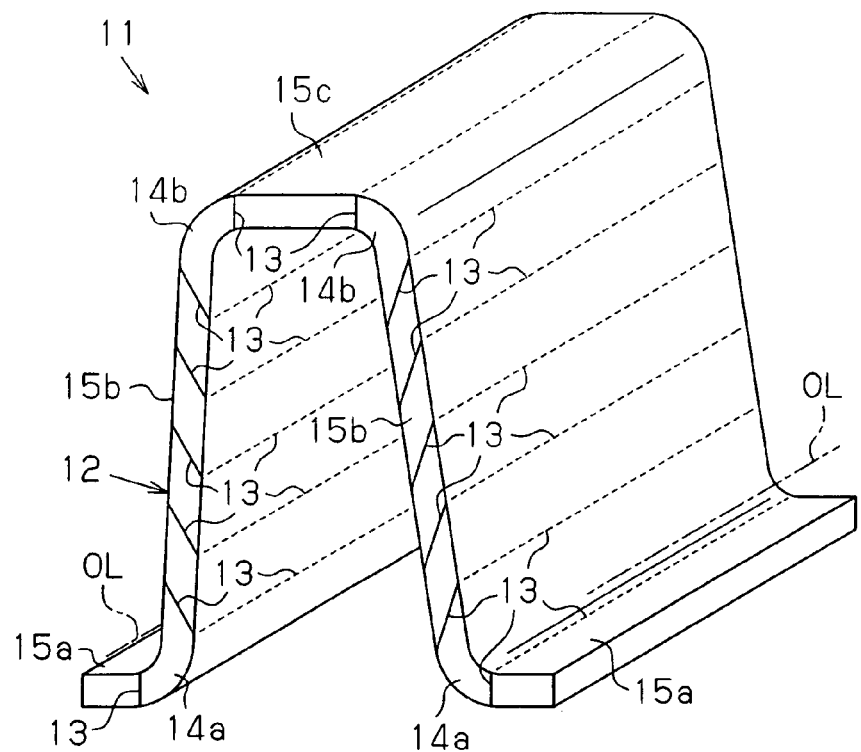
FIG. 1A is a schematic perspective view illustrating a three-dimensional fiber structure according to a first embodiment of the present invention.
Figure 1B:
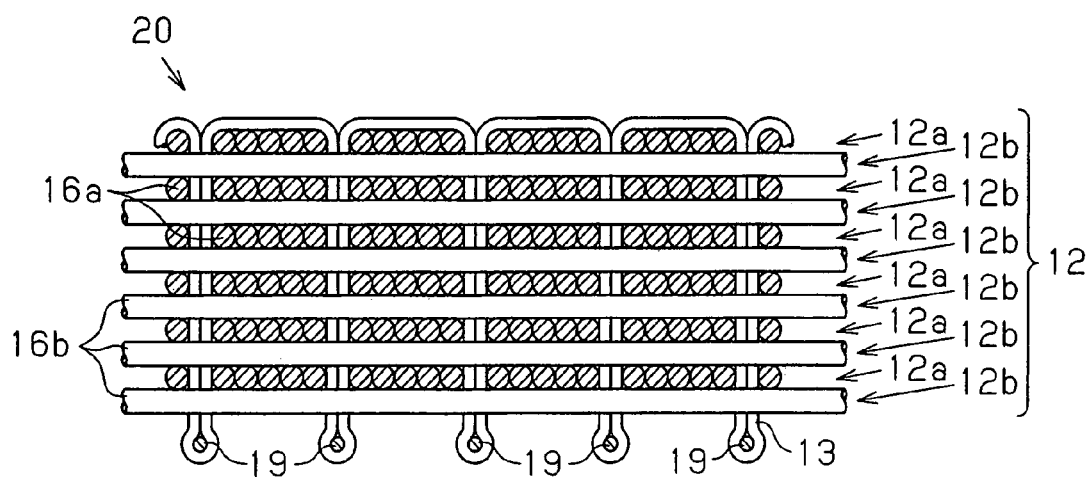
FIG. 1B is a schematic cross-sectional view illustrating the relationship between the laminated body of the primary structure of FIG. 1A and the connection yarn.

As shown in FIGS. 1A and 1B, a three-dimensional fiber structure 11 includes a fiber lamination 12 and connection yarns 13 for connecting the fiber lamination 12. The fiber lamination 12 is a laminated body including continuous fibers, which are oriented biaxially. The term continuous fiber does not necessarily mean a mono filament, but refers also to a fiber bundle that includes bundles of mono filaments. The continuous fiber is, for example, carbon fiber. The number of filaments of carbon fiber is in a range from 3000 to 24000. The connection yarns 13 are arranged in the thickness direction of the fiber lamination 12. The term yarn does not necessarily mean a twisted yarn, but refers also to a fiber bundle in which fibers are merely put in a bundle and are virtually not twisted, which is a roving.

As shown in FIG. 1A, the fiber lamination 12 is a three-dimensional plate. The term three-dimensional plate means that the entire fiber lamination 12 is not flat, and has a three-dimensional form as a whole made by bending a plate.

The fiber lamination 12 has a hat-like cross-section. The fiber lamination 12 has left-right symmetry in FIG. 1A. The fiber lamination 12 includes two first bent portions 14a and two second bent portions 14b. Each of the first bent portions 14a is bent in different direction from the associated second bent portion 14b. In addition, the fiber lamination 12 includes two flanges 15a, two inclined plates 15b, and a top plate 15c. From the left to the right of FIG. 1A, the flange 15a, the first bent portion 14a, the inclined plate 15b, the second bent portion 14b, the top plate 15c, the second bent portion 14b, the inclined plate 15b, the first bent portion 14a, and the flange 15a are continuously arranged in this order.

The first bent portions 14a are located at the brim of the hat shape. The second bent portions 14b are located at the top of the hat shape. Each flange 15a has a free end and a connected end, which is opposite to the free end and connected to the associated first bent portion 14a. Each inclined plate 15b is sandwiched between the associated first bent portion 14a and the second bent portion 14b. That is, each inclined plate 15b is adjacent to the associated first bent portion 14a and the second bent portion 14b. The top plate 15c is located between the two second bent portions 14b. That is, the top plate 15c is adjacent to the two second bent portions 14b.

As shown in FIG. 1B, the fiber lamination 12 includes 0-degree fiber layers 12a and 90-degree fiber layers 12b, which are alternately laminated one by one. That is, the fiber lamination 12 includes fibers oriented biaxially. Each of the 0-degree fiber layers 12a is a fiber layer formed by first continuous fibers 16a having an arrangement angle of 0°. Each 90-degree fiber layer 12b is a fiber layer formed by second continuous fibers 16b having an arrangement angle of 90°. In this specification, the term arrangement angle 0° refers to a state where the continuous fibers are arranged parallel to the centerline of curvature OL of the first bent portions 14a. The centerline of curvature OL of the first bent portions 14a is parallel to the centerline of curvature of the second bent portions 14b. The term arrangement angle 90° refers to a state where the continuous fibers are arranged perpendicular to the centerline of curvature OL of the first bent portions 14a.

Figure 2A:
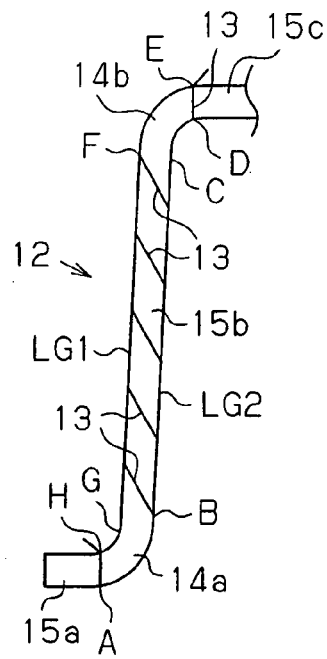
FIG. 2A is a schematic diagram illustrating the arrangement of the connection yarn at the flat portion sandwiched between the first bent portion and the second bent portion shown in FIG. 1A.

FIG. 2A shows the cross-section of the fiber lamination 12 along an imaginary plane perpendicular to the centerline of curvature OL of one of the first bent portions 14a. In this cross-section, a line that connects points A, B, C, D, E, F, G, H shows contour of one of the first bent portions 14a, one of the inclined plates 15b, and one of the second bent portions 14b. The contour will be referred to as ABCDEFG. The contour ABCDEFGH includes a first outline LG1, which is one side of the fiber lamination 12 in the thickness direction, and a second outline LG2, which is the other side of the fiber lamination 12 in the thickness direction. The length of the first outline LG1 is equal to the length of the second outline LG2. Thus, at the cross-section of the fiber lamination 12 along the imaginary plane perpendicular to the centerline of curvature OL of one of the first bent portions 14a, the length of the first outline LG1 on one side in the thickness direction is equal to the length of the second outline LG2 on the other side.

As shown in FIGS. 1A and 2A, in the inclined plates 15b, the connection yarns 13 are arranged to obliquely cross the fiber lamination 12. Each inclined plate 15b is located between the associated first bent portion 14a and the associated second bent portion 14b, which are bent in different directions from each other. In the flanges 15a and the top plate 15c, the connection yarns 13 are arranged perpendicular to the fiber lamination 12. One end of each flange 15a is a free end. The top plate 15c is located between a pair of the second bent portions 14b, which are bent in the same direction.

That is, among one of the flanges 15a and one of the inclined plates 15b, which are adjacent to each other with the associated first bent portion 14a located in between, the inclined plate 15b is a first flat portion, and the flange 15a is a second flat portion. Among one of the inclined plates 15b and the top plate 15c, which are adjacent to each other with the associated second bent portion 14b located in between, the inclined plate 15b is a first flat portion, and the top plate 15c is a second flat portion. The connection yarns 13 in the first flat portion (15b) are arranged to obliquely cross the fiber lamination 12, that is, the fiber layer. The connection yarns 13 in the second flat portions (15a, 15c) are arranged perpendicular to the fiber lamination 12.

Figure 2B:
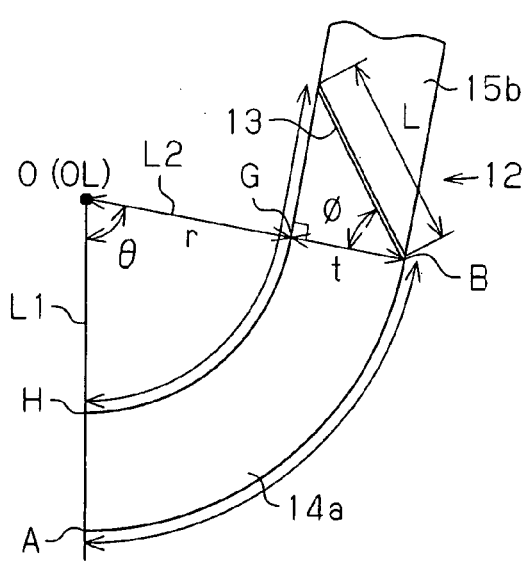
FIG. 2B is a schematic diagram illustrating the relationship between the inner path and the outer path of the bent portion shown in FIG. 1A.

The fiber lamination 12 is bent such that no difference is made between the lengths of the outside and the inside of each inclined plate 15b, which is located between the associated first bent portion 14a and the associated second bent portion 14b. Therefore, as shown in FIG. 2B, assuming that the length of part of the connection yarns 13 that obliquely cross the fiber lamination 12 at the inclined plate 15b is represented by L, the angle of the first bent portion 14a is represented by θ (radian), and the thickness of the fiber lamination 12 at the first bent portion 14a is represented by t, the equation t/L=cos (tan$^{-1}$θ) is satisfied. The equation is proved by the equations (1) and (2) described below. The term length L of the connection yarns refers to the length of part of the connection yarns 13 that is inserted in the three-dimensional fiber structure 11. The term angle θ of the first bent portion 14a refers to the angle between the straight lines L1, L2, which connect the center of curvature O of the first bent portion 14a to the ends of the first bent portion 14a. t/L=cos(tan$^{-1}$θ) is satisfied also in the case with the second bent portion 14b.

Next, a method for manufacturing the three-dimensional fiber structure 11 will now be described.

The manufacturing method includes a continuous fiber arranging process, a connection yarn inserting process, and a bending process.

Figure 3A:
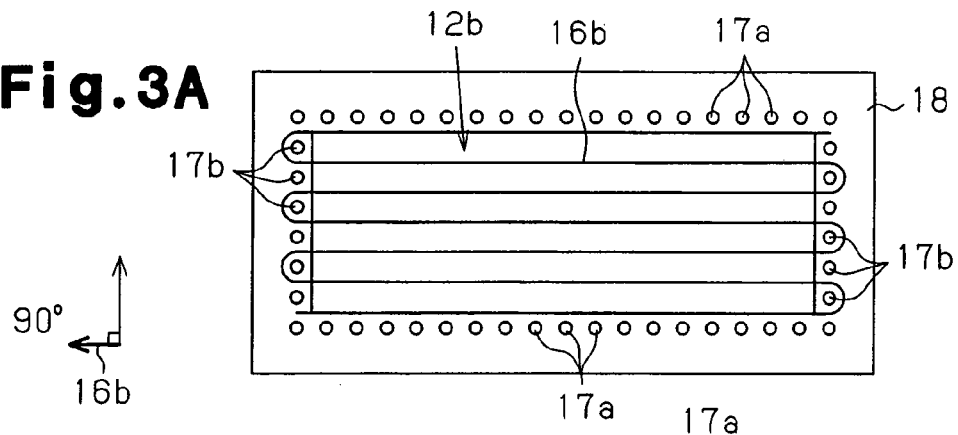
FIGS. 3A and 3B are schematic plan views illustrating a jig for manufacturing the three-dimensional fiber structure shown in FIG. 1A and the arrangement state of the continuous fiber.
Figure 3B:
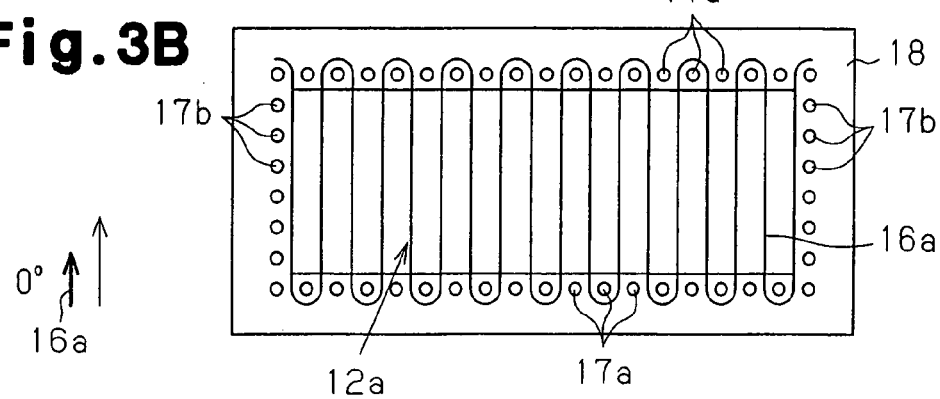

In the continuous fiber arranging process, a jig 18 as shown in FIGS. 3A and 3B is used. The jig 18 includes first pins 17a and second pins 17b, which are arranged at a predetermined pitch. The first pins 17a and the second pins 17b function as restricting members. The first pins 17a and the second pins 17b are detachably mounted on the jig 18. The jig 18 is a rectangular frame. The first pins 17a are arranged on the long side of the jig 18, and the second pins 17b are arranged on the short side of the jig 18.

As shown in FIG. 3A, the second continuous fibers 16b are arranged parallel to the longitudinal direction of the jig 18. As shown in FIG. 3B, the first continuous fibers 16a are arranged perpendicular to the longitudinal direction of the jig 18. The direction perpendicular to the longitudinal direction of the jig 18 is set as 0° of the orientation angle. That is, the arrangement angle of the second continuous fiber 16b is 90°. The arrangement angle of the first continuous fibers 16a is 0°.

The pitch of the first pins 17a is set in accordance with the arrangement pitch of the first continuous fibers 16a. The pitch of the second pins 17b is set in accordance with the arrangement pitch of the second continuous fibers 16b.

As shown in FIG. 3B, on the jig 18, each of the first continuous fibers 16a passes between the adjacent first pins 17a, and is folded back every time the first continuous fiber 16a is engaged with one of the first pins 17a. As a result, the fiber layer having an arrangement angle of 0°, which is a 0-degree fiber layer 12a in this embodiment, is formed.

As shown in FIG. 3A, each of the second continuous fibers 16b passes between the adjacent second pins 17b, and is folded back every time the second continuous fiber 16b is engaged with one of the second pins 17b. As a result, the fiber layer having an arrangement angle of 90°, which is a 90-degree fiber layer 12b in this embodiment, is formed. The 90-degree fiber layers 12b and 0-degree fiber layers 12a are alternately laminated to form the fiber lamination 12 including biaxially oriented fibers. FIGS. 3A and 3B exaggerate the arrangement intervals of the first continuous fibers 16a and the arrangement intervals of the second continuous fibers 16b. However, the adjacent first continuous fibers 16a actually contact each other. The adjacent second continuous fibers 16b actually contact each other.

After the continuous fiber arranging process, the connection yarn inserting process is performed in a state where the jig 18 holds the fiber lamination 12. The connection yarns 13 are inserted in the same manner as the method disclosed in, for example, Japanese Laid-Open Patent Publication No. 9-137336. More specifically, insertion needles (not shown) are inserted in the thickness direction of the fiber lamination 12. Each connection yarn 13 is threaded through the eye of one of the insertion needles located at the distal end. The insertion needles are proceeded until the needle eyes to each of which the connection yarn 13 is engaged penetrate the fiber lamination 12. Thereafter, the insertion needles are slightly retracted. As a result, each connection yarn 13 forms an U-shaped loop.

Subsequently, a lock yarn needle (not shown) is inserted in the U-shaped loops. When the lock yarn needle reaches the end of the fiber lamination 12, the lock yarn needle is stopped. Then, a lock yarn 19 shown in FIG. 1B is engaged with the distal end of the lock yarn needle. By pulling back the lock yarn needle, the lock yarn 19 is inserted in the U-shaped loop of each connection yarn 13. When the insertion needles are pulled back in this state, the connection yarns 13 tighten the lock yarn 19. As a result, the fiber layers 12a, 12b are bound to form the fiber lamination 12.

The fiber lamination 12 includes first sections, which will be the flanges 15a after the bending process, second sections, which will be the inclined plates 15b at least after the bending process, and a third section, which will be the top plate 15c after the bending process. The length of the connection yarns 13 inserted in each second section is longer than the thickness of the inclined plates 15b. In a case where the thickness of the fiber lamination 12 after bending varies, the length of the connection yarns 13 inserted in each first section is longer than the thickness of the flange 15a. Finishing insertion of the connection yarns 13 into the fiber lamination 12 completes a flat primary structure 20, that is, a preform. That is, the primary structure 20 includes the connection yarns 13, which bind the 0-degree fiber layers 12a and the 90-degree fiber layers 12b together.

Subsequently, the bending process is executed. As a result, the first bent portions 14a and the second bent portions 14b are formed at predetermined positions of the primary structure 20. The primary structure 20 is bent such that the fiber volume fraction of the fiber lamination 12 having the first bent portions 14a and the second bent portions 14b is higher than the fiber volume fraction of the primary structure 20.

Figure 4A:
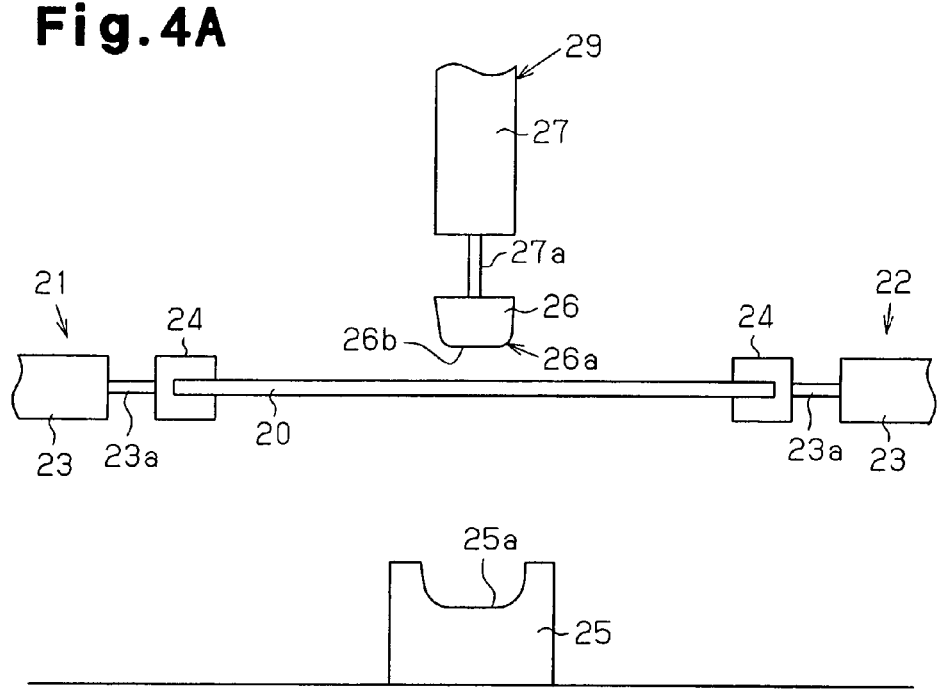
FIGS. 4A and 4B are schematic diagrams illustrating a bending process for manufacturing the three-dimensional fiber structure shown in FIG. 1A.
Figure 4B:
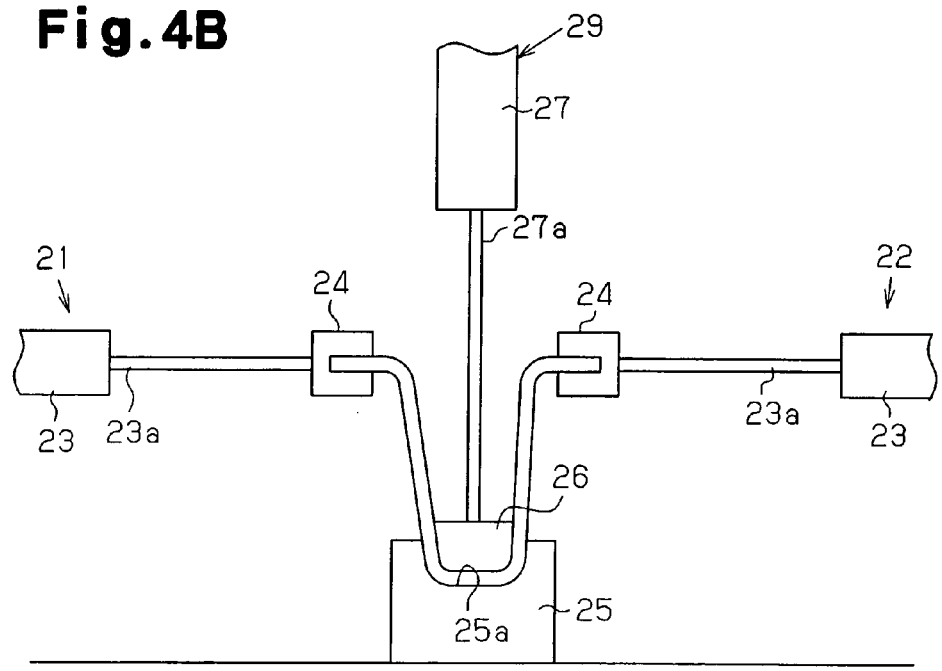

As shown in FIGS. 4A and 4B, a shaping apparatus 29 bends the primary structure 20. The primary structure 20 includes fourth sections, which will be the first bent portions 14a after bending, and fifth sections, which will be the second bent portions 14b after bending. The shaping apparatus 29 retains both ends of the primary structure 20 outside the fourth sections and the fifth sections to hold the primary structure 20. The shaping apparatus 29 applies tension to the primary structure 20 within a predetermined range. The tension is applied in a direction equal to the arrangement direction of the second continuous fibers 16b, that is, in a direction of the arrangement angle 90°. While applying tension in this manner, the shaping apparatus 29 depresses the primary structure 20 in a direction perpendicular to the direction in which tension is applied.

As shown in FIGS. 4A and 4B, the shaping apparatus 29 includes a set of clamping devices 21, 22, a stationary mold 25, a movable mold 26, and a cylinder 27. The clamping devices 21, 22 selectively clamp the ends of the primary structure 20. Each clamping device 21, 22 includes an air cylinder 23, which has a piston rod 23a extending horizontally, and a clamp portion 24, which is provided at the distal end of the piston rod 23a. In a state where a pair of the clamp portions 24 clamp the ends of the primary structure 20, that is, the preform, the air cylinders 23 pull the primary structure 20 with tension of a predetermined range.

The stationary mold 25 includes a mold surface 25a, which corresponds to the outer shape of the second bent portions 14b. The movable mold 26 includes a depressing surface 26a, which corresponds to the inner shape of the second bent portions 14b. The movable mold 26 is fixed at the distal end of a piston rod 27a, which extends in the vertical direction from the cylinder 27. The cylinder 27 selectively moves the movable mold 26 between a standby position and an operation position. The movable mold 26 at the operation position depresses the primary structure 20, which is held by the clamping devices 21, 22 under tension within a predetermined range. The depressing surface 26a of the movable mold 26 includes a flat portion 26b, which will be sandwiched between a pair of the second bent portions 14b. The friction resistance of the flat portion 26b is preferably increased to prevent the flat portion 26b from sliding with respect to the primary structure 20 when the flat portion 26b depresses the primary structure 20. For example, the flat portion 26b is provided with lining of material that has a great friction resistance such as rubber.

To bend the primary structure 20, first, the clamp portions 24 of the clamping devices 21, 22 clamp the primary structure 20 as shown in FIG. 4A. The clamping devices 21, 22 apply tension on the primary structure 20 within a predetermined range in the horizontal direction. In this state, the cylinder 27 is actuated to lower the movable mold 26 from the standby position. While being lowered, the depressing surface 26a of the movable mold 26 engages the primary structure 20. Thus, the movable mold 26 applies pressure on the primary structure 20. The movable mold 26 moves further downward from the state where the movable mold 26 is engaged with the primary structure 20. Part of the primary structure 20 engaged with the movable mold 26 moves downward. Accordingly, the projection amount of the piston rods 23a from the air cylinders 23 is increased. That is, the distance between the clamp portions 24 is reduced.

Thus, in a state where the clamp portions 24 apply tension on the primary structure 20 in the horizontal direction at a certain height, the movable mold 26 depresses the center portion of the primary structure 20 downward. The movable mold 26 moves the center portion of the primary structure 20 downward. Thus, the second bent portions 14b are formed at part of the primary structure 20 corresponding to the depressing surface 26a. Furthermore, the first bent portions 14a are formed at part of the primary structure 20 close to the clamp portions 24. When the primary structure 20 is bent, for example, observing only the first bent portions 14a, the length of the inner path of the first bent portions 14a differs from the length of the outer path of the first bent portions 14a. The inner path of the first bent portions 14a is shorter than the outer path of the first bent portions 14a. If the 90-degree fiber layers 12b are displaced to absorb the difference between the length of the inner path and the length of the outer path, that is, the path difference, wrinkles and distortion are prevented from being generated inside the first bent portions 14a.

To permit the 90-degree fiber layers 12b to be displaced, the connection yarns 13 need to be arranged obliquely with respect to the thickness direction of the fiber lamination 12. The connection yarns 13 are inclined in accordance with the displacement of the 90-degree fiber layers 12b.

In the conventional art, however, the bending process has been executed without variation in the thickness of the fiber lamination 12 before and after the bending process. Therefore, in the conventional art, the connection yarns 13, which connect the 90-degree fiber layers 12b, are unable to be inclined with respect to the thickness direction of the fiber lamination 12. As a result, wrinkles and distortion might be formed inside the first bent portions 14a and the second bent portions 14b.

In comparison, the primary structure 20 of the first embodiment is bent while being compressed in the thickness direction. The length of the connection yarns 13 inserted in parts of the primary structure 20 that will be the inclined plates 15b after the bending process is longer than the thickness of the inclined plates 15b. When the primary structure 20 is bent, the thickness of the primary structure 20 is reduced. The connection yarns 13 are longer than the thickness of the fiber lamination 12. As a result, when the primary structure 20 is bent, as the 90-degree fiber layers 12b are displaced to absorb the path difference between the inner path and the outer path of the first bent portions 14a, the connection yarns 13 are arranged obliquely with respect to the thickness direction of the fiber lamination 12. The first bent portion 14a and the second bent portion 14b, which are bent in different directions exist on both sides of each inclined plates 15b. Therefore, the connection yarns 13 are deformed such that the displacement of the outside of the second bent portion 14b absorbs the displacement of the inside of the first bent portion 14a.

FIG. 2B illustrates one of the first bent portions 14a viewed from the direction corresponding to the imaginary plane perpendicular to the centerline of curvature OL of the first bent portion 14a. As shown in FIG. 2B, assume that the angle of the first bent portion 14a, that is, the bending angle is represented by θ (radian), the thickness of the fiber lamination 12 at the first bent portion 14a is represented by t, and the length of the connection yarn 13, which obliquely crosses the fiber lamination 12 in the inclined plate 15b continuous with the first bent portion 14a, is represented by L. If the first bent portions 14a are formed without generating wrinkles and distortion inside the bent portions 14a, the length of the outer path of the first bent portions 14a corresponding to the angle θ of the bent portion is represented by (r+t)θ, the length of the inner path is represented by rθ. Assuming that the angle between the connection yarn 13 and the thickness direction of the inclined plate 15b is represented by Φ, the following equation (1) is satisfied.

$$(r+t)\theta = r\theta + t \tan \Phi \quad (1)$$

The equation (1) leads to θ=tan Φ, then Φ=tan$^{-1}$θ.
Since cos Φ=t/L, the equation (2) is satisfied.

$$t/L = \cos(\tan^{-1} \theta) \quad (2)$$

In the connection yarn inserting process of the first embodiment, the connection yarns 13 are inserted in the fiber lamination 12 such that the length of the connection yarns 13 satisfies the equation (2). Thus, the bending process forms the first bent portions 14a and the second bent portions 14b without generating wrinkles and distortion on the inside of the first bent portions 14a and the second bent portions 14b.

The left part t/L of the equation (2) represents the ratio of the thickness (t) of the fiber lamination 12 after bending and the thickness (L) of the fiber lamination 12 before bending. The ratio t/L is equal to the ratio between the fiber volume fraction (Vf) of the fiber lamination 12 after bending and the fiber volume fraction (Vf) of the fiber lamination 12 before bending. Therefore, the equation (2) shows that the variation (t/L) of the fiber volume fraction for manufacturing the three-dimensional fiber structure 11 without generating wrinkles and distortion inside the first bent portions 14a and the second bent portions 14b is not dependent on the inner diameter, that is, the curvature radius r of the first bent portions 14a and the second bent portions 14b, but is dependent on the angle θ of the first bent portions 14a and the second bent portions 14b. That is, by adjusting the length L of the connection yarns 13 when manufacturing the primary structure 20 and the angle θ of the first bent portions 14a and the second bent portions 14b during the bending process, the three-dimensional fiber structure 11 having a desired fiber volume fraction is manufactured.

When manufacturing a composite including a reinforcing material made of the three-dimensional fiber structure 11 having a fiber volume fraction of 70% or more and a resin matrix, it is difficult to uniformly impregnate the three-dimensional fiber structure 11 with the resin. If the fiber volume fraction Vf of the primary structure 20 is too low, the handling performance of the primary structure 20 is reduced, which reduces the operability. If the fiber volume fraction Vf of the primary structure 20 is too high, the length of the connection yarns 13 is reduced, which reduces the angle θ of the bent portions 14a, 14b. To permit the angle θ of the bent portions 14a, 14b to be greater than or equal to 30° and secure the formability and the handling performance of the primary structure 20, the fiber volume fraction Vf of the primary structure 20 should be 20 to 60%.

Tables 1 to 4 show cases where the thickness of the three-dimensional fiber structure 11, that is, the thickness t of the fiber lamination 12 after bending is fixed to 5 mm, the outer diameter R of the bent portion 14a, 14b is fixed to 10 mm, and the inner diameter r is fixed to 5 mm. Tables 1, 2, 3 and 4 show the relationship among the fiber volume fraction Vf of the primary structure 20, the length L of the connection yarns 13, and the angle (°) of the bent portions 14 a, 14b when manufacturing the three-dimensional fiber structure 11 having the fiber volume fraction Vf of 40%, 50%, 60%, and 70%, respectively.

TABLE 1

| Thickness t mm | Outer Diameter R mm | Inner Diameter r mm | Molded Vf % | Pre-Bending Vf % | L mm | Bending Angle ° |
|---|---|---|---|---|---|---|
| 5 | 10 | 5 | 40 | 35 | 5.71 | 31.7 |
| 5 | 10 | 5 | 40 | 30 | 6.67 | 50.5 |
| 5 | 10 | 5 | 40 | 25 | 8.00 | 71.6 |
| 5 | 10 | 5 | 40 | 21.5 | 9.30 | 89.9 |
| 5 | 10 | 5 | 40 | 20 | 10.0 | 99.2 |

TABLE 2

| Thickness t mm | Outer Diameter R mm | Inner Diameter r mm | Molded Vf % | Pre-Bending Vf % | L mm | Bending Angle ° |
|---|---|---|---|---|---|---|
| 5 | 10 | 5 | 50 | 45 | 5.56 | 27.7 |
| 5 | 10 | 5 | 50 | 40 | 6.25 | 43.0 |
| 5 | 10 | 5 | 50 | 35 | 7.14 | 58.5 |
| 5 | 10 | 5 | 50 | 30 | 8.33 | 76.4 |
| 5 | 10 | 5 | 50 | 28 | 8.93 | 84.8 |
| 5 | 10 | 5 | 50 | 27 | 9.31 | 90.0 |
| 5 | 10 | 5 | 50 | 25 | 10.00 | 99.2 |
| 5 | 10 | 5 | 50 | 20 | 12.50 | 131.3 |

TABLE 3

| Thickness t mm | Outer Diameter R mm | Inner Diameter r mm | Molded Vf % | Pre-Bending Vf % | L mm | Bending Angle ° |
|---|---|---|---|---|---|---|
| 5 | 10 | 5 | 60 | 50 | 6.00 | 38.0 |
| 5 | 10 | 5 | 60 | 45 | 6.67 | 50.5 |
| 5 | 10 | 5 | 60 | 40 | 7.50 | 64.1 |
| 5 | 10 | 5 | 60 | 35 | 8.57 | 79.8 |
| 5 | 10 | 5 | 60 | 32 | 9.38 | 90.9 |
| 5 | 10 | 5 | 60 | 30 | 10.00 | 99.2 |
| 5 | 10 | 5 | 60 | 25 | 12.00 | 125.0 |
| 5 | 10 | 5 | 60 | 20 | 15.00 | 162.1 |

TABLE 4

| Thickness t mm | Outer Diameter R mm | Inner Diameter r mm | Molded Vf % | Pre-Bending Vf % | L mm | Bending Angle ° |
|---|---|---|---|---|---|---|
| 5 | 10 | 5 | 70 | 60 | 5.83 | 34.4 |
| 5 | 10 | 5 | 70 | 55 | 6.36 | 45.1 |
| 5 | 10 | 5 | 70 | 50 | 7.00 | 56.1 |
| 5 | 10 | 5 | 70 | 45 | 7.78 | 68.3 |
| 5 | 10 | 5 | 70 | 40 | 8.75 | 82.3 |
| 5 | 10 | 5 | 70 | 37.5 | 9.33 | 90.3 |
| 5 | 10 | 5 | 70 | 35 | 10.00 | 99.2 |
| 5 | 10 | 5 | 70 | 30 | 11.67 | 120.8 |
| 5 | 10 | 5 | 70 | 25 | 14.00 | 149.8 |

In Tables 1 to 4, "Molded Vf" represents the fiber volume fraction Vf of the three-dimensional fiber structure 11. "Pre-Bending Vf" represents the fiber volume fraction Vf of the primary structure 20.

The case where the angle θ of the bent portions 14a, 14b is 90° will be described. As apparent from Table 1, when the fiber volume fraction of the three-dimensional fiber structure 11, that is, "Molded Vf" is 40%, the fiber volume action of the primary structure 20, that is, "Pre-Bending Vf" is approximately 22%. As apparent from Table 2, when the fiber volume fraction of the three-dimensional fiber structure 11 is 50%, the fiber volume fraction of the primary structure 20 is approximately 27%. As apparent from Table 3, when the fiber volume fraction of the three-dimensional fiber structure 11 is 60%, the fiber volume fraction of the primary structure 20 is approximately 32%. As apparent from Table 4, when the fiber volume fraction of the three-dimensional fiber structure 11 is 70%, the fiber volume fraction of the primary structure 20 is approximately 37%.

The three-dimensional fiber structure 11 formed as described above is impregnated with resin and cured to manufacture a fiber-reinforced composite (fiber-reinforced resin). For impregnation and curing of resin, for example, a resin transfer molding (RTM) method is employed. In the RTM method, the three-dimensional fiber structure 11 is arranged in a mold for resin impregnation, that is, a shaping mold. A thermosetting matrix resin is injected in the mold for resin impregnation so that the three-dimensional fiber structure 11 is impregnated with the thermosetting matrix resin. Thereafter, the matrix resin is cured by heat to manufacture the fiber-reinforced composite. The thermosetting resin is, for example, epoxy resin.

The first embodiment has the following advantages.

(1) The fiber lamination 12, which configures the three-dimensional fiber structure 11, includes the fiber layers 12a, 12b, which are laminated to be biaxially oriented. Each of the fiber layers 12a, 12b is formed by the continuous fibers. The fiber lamination 12, which is a three-dimensional plate, includes the first bent portions 14a, the second bent portions 14b, and the flat portions (15a, 15b, 15c). The first bent portions 14a, the second bent portions 14b, and the flat portions (15a, 15b, 15c) are continuous with one another. The connection yarns 13 are arranged to cross the fiber layers 12a, 12b.

Each of the inclined plates 15b and the corresponding one of the flanges 15a are adjacent to each other with the associated first bent portion 14a located in between. Of the inclined plates 15b and the flanges 15a, the connection yarns 13 of the inclined plates 15b obliquely cross the fiber lamination 12. Each of the inclined plates 15b and the top plate 15c are adjacent to each other with the associated second bent portion 14b located in between. The connection yarns 13 of the inclined plates 15b obliquely cross the fiber lamination 12. The connection yarns 13 of the flanges 15a and the top plate 15c are arranged perpendicular to the fiber layers.

Therefore, when manufacturing the three-dimensional fiber structure 11, although the fiber lamination 12, which is bound by the connection yarns 13, is bent, wrinkles and distortion are suppressed from being generated in the bent portions 14a, 14b.

The composite, that is, the fiber-reinforced resin may include a reinforcing material formed of the three-dimensional fiber structure 11. In this case, for example, as compared to a case where the connection yarns 13 extend parallel to the thickness direction of the inclined plates 15b, the strength of the inclined plates 15b against shear force is improved.

(2) At the cross-sectional shape ABCDEFGH of the fiber lamination 12 along the imaginary plane perpendicular to the centerline of curvature OL of each first bent portion 14a, the length of the first outline LG1 on one side of the thickness direction is equal to the length of the second outline LG2 on the other side. Therefore, when bending the primary structure 20, the second continuous fibers 16b, which extend perpendicular to the centerline of curvature OL of each first bent portion 14a are smoothly displaced. Thus, the three-dimensional fiber structure 11 is manufactured while suppressing generation of wrinkles and distortion in the bent portions 14a, 14b.

(3) The fiber lamination 12 includes the inclined plates 15b, each of which is located between one of the first bent portions 14a and the associated second bent portion 14b, which are bent in different directions. Each inclined plate 15b is adjacent to one of the first bent portions 14a and the associated second bent portion 14b. The connection yarns 13 of the inclined plates 15b obliquely cross the fiber lamination 12.

In other words, each first bent portion 14a and the associated second bent portion 14b, which are adjacent to each other with the corresponding inclined plate 15b located in between, are bent in different directions. Therefore, the fiber layers 12a, 12b located outside at the first bent portions 14a are located inside at the second bent portions 14b. That is, the directions in which the fiber layers 12a, 12b are bent change alternately. Thus, when forming the three-dimensional fiber structure 11, the fiber lamination 12 is easily bent while preventing generation of wrinkles and distortion in the continuous fibers 16a, 16b at the bent portions 14a, 14b.

(4) The length L of the connection yarns 13, which obliquely cross the fiber lamination 12 at the inclined plates 15b, the angle θ (radian) of the bent portions 14a, 14b, and the thickness t of the fiber lamination 12 at the bent portions 14a, 14b satisfy the relationship represented by the equation $t/L = \cos(\tan^{-1}\theta)$. The three-dimensional fiber structure 11 is manufactured such that the length of the connection yarns 13 satisfy the above relationship. Therefore, regardless of the thickness of the three-dimensional fiber structure 11, the primary structure 20 is easily bent without generating wrinkles and distortion in the continuous fibers at the bent portions 14a, 14b.

(5) The composite is manufactured such that the composite includes a reinforcing material formed of the three-dimensional fiber structure 11 and a resin matrix. In this case, the composite, that is, the fiber-reinforced resin is easily manufactured that does not have wrinkles and distortion on the inside of the bent portions 14a, 14b.

(6) The method for manufacturing the three-dimensional fiber structure 11 includes the continuous fiber arranging process, the connection yarn inserting process, and the bending process. In the continuous fiber arranging process, the fiber layers 12a, 12b formed by the continuous fibers are laminated on the jig 18. As a result, the fiber lamination 12 including at least biaxially oriented fibers is formed.

In the connection yarn inserting process, the flat primary structure 20 is formed by inserting the connection yarns 13 in the fiber lamination 12 on the jig 18. The connection yarns 13 are inserted perpendicular to the fiber lamination 12. The length of the connection yarns 13 inserted in the fiber lamination 12 is longer than the thickness of the fiber lamination 12 at the inclined plates 15b after the bending process.

The bending process is executed such that the fiber volume fraction of the fiber lamination 12 after forming the bent portions 14a, 14b will be higher than the fiber volume fraction of the primary structure 20. Therefore, the three-dimensional fiber structure 11 is easily manufactured while suppressing generation of wrinkles and distortion at the bent portions 14a, 14b.

(7) The angle θ (radian) of the bent portions 14a, 14b, the thickness t of the fiber lamination 12, and the length L of the connection yarns 13 in the inclined plates 15b satisfy the relationship represented by the equation $t/L=\cos(\tan^{-1}\theta)$. The length of the connection yarns 13 inserted in the fiber lamination 12 in the connection yarn inserting process is set to satisfy the above-mentioned relationship. Each inclined plate 15b is located between one of the first bent portions 14a and the associated second bent portion 14b, which are bent in different directions. Therefore, the primary structure 20 is easily bent while preventing generation of wrinkles and distortion in the continuous fibers located at the inside of the bent portions 14a, 14b.

(8) The shaping apparatus 29 bends the primary structure 20. The shaping apparatus 29 retains the primary structure 20 at portions closer to the ends than the portions that will be the bent portions 14a, 14b after bending. The shaping apparatus 29 applies tension within a predetermined range on the primary structure 20 in the arrangement angle 90°. That is, the shaping apparatus 29 applies tension that acts in the arrangement direction of the second continuous fibers 16b on the primary structure 20. The movable mold 26 of the shaping apparatus 29 depresses the primary structure 20 in a direction perpendicular to the direction in which the tension is applied. This facilitates the bending process.

(9) Carbon fiber is used for the continuous fibers 16a, 16b. As compared to fiber such as nylon and acrylic having an elongation percentage of 10% or more, the break elongation of the carbon fiber is generally as small as 0.5% to 2.4%. For example, when bending the primary structure 20, if the connection yarns 13 are not allowed to move, wrinkles and distortion are easily generated inside the bent portions.

However, according to the first embodiment, even if the carbon fiber is used for the continuous fibers 16a, 16b, the bent portions 14a, 14b are reasonably formed.

A second embodiment of the present invention will now be described with reference to FIGS. 5 and 6.

A method for manufacturing the three-dimensional fiber structure 11 according to the second embodiment differs from the first embodiment. More specifically, the length of the connection yarns 13 inserted during the connection yarn inserting process varies in accordance with the position of the fiber lamination 12. Other configurations are basically the same as the first embodiment, and explanations are omitted.

For example, a case will be considered where the connection yarns 13 are inserted in the fiber lamination 12 such that the length of the connection yarns 13 is the same throughout the entire length of the fiber lamination 12 in forming the primary structure 20 in the connection yarn inserting process. In this case, part of the connection yarns 13 inserted in the flanges 15a and the top plate 15c might become loose after the bending process. That is, part of the connection yarns 13 inserted in the flat portions (15a, 15c) but not in the inclined plates 15b might become loose.

Part of the connection yarns 13 might become loose because the fiber volume fraction of the fiber lamination 12 after the bending process is higher than the fiber volume fraction of the primary structure 20. Thus, the thickness of the three-dimensional fiber structure 11, that is, the thickness of the fiber lamination 12 after the bending process is thinner than the thickness of the primary structure 20. Therefore, the length of the connection yarns 13 that are inserted in a part of the fiber lamination 12 that is not displaced during the bending process will be longer than the thickness of the three-dimensional fiber structure 11. In other words, the length of the connection yarns 13 that do not move to be inclined will be longer than the thickness of the three-dimensional fiber structure 11. Thus, the connection yarns 13 might become loose.

In the connection yarn inserting process according to the second embodiment, the length of the connection yarns 13 corresponding to the inclined plates 15b is set to satisfy the equation (2) in the first embodiment, that is, $t/L=\cos(\tan^{-1}\theta)$. Parts of the fiber lamination 12 corresponding to the inclined plates 15b are displaced during the bending process. Other flat portions, that is, the length of the connection yarns 13 corresponding to the flanges 15a and the top plate 15c is set equal to the thickness t of the three-dimensional fiber structure 11. The thickness t is equal to the thickness of the fiber lamination 12 at the flanges 15a and the top plate 15c after the bending process. Parts of the fiber lamination 12 corresponding to the flanges 15a and the top plate 15c are not displaced during the bending process.

Figure 5:
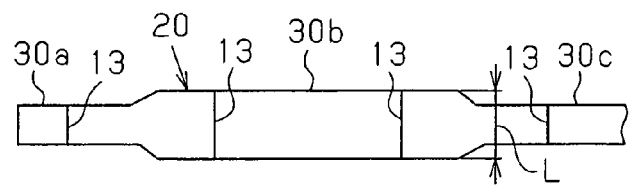
FIG. 5 is a partial schematic diagram illustrating the arrangement state of the connection yarn in the primary structure according to a second embodiment of the present invention.
Figure 6:
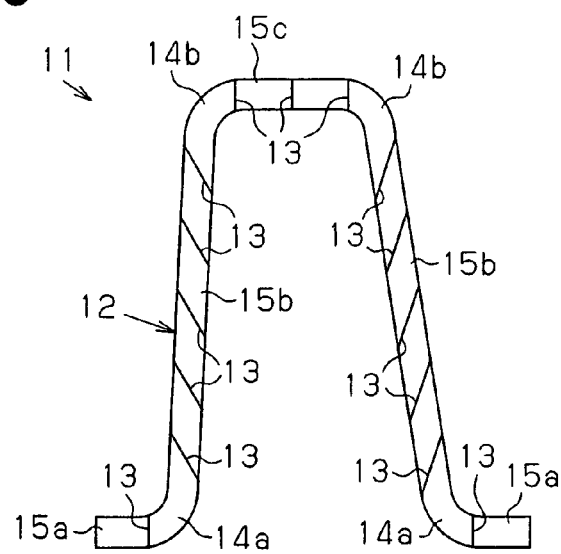
FIG. 6 is a schematic diagram illustrating the three-dimensional fiber structure shown in FIG. 5.

FIG. 5 shows approximately half of the primary structure 20 according to the second embodiment. The primary structure 20 includes first sections 30a, which correspond to the flanges 15a, second sections 30b, which correspond to the inclined plates 15b, and a third section 30c, which corresponds to the top plate 15c.

As shown in FIG. 5, the length of the connection yarns 13 inserted in the second sections 30b is set to L. The length of the connection yarns 13 inserted in the first sections 30a is set to the thickness t of the three-dimensional fiber structure 11. The length of the connection yarns 13 inserted in the third section 30c is set to the thickness t of the three-dimensional fiber structure 11. Each first section 30a and the third section 30c are located on both sides of the second section 30b and sandwiches the second section 30b.

The proportion of the first sections 30a, the second sections 30b, and the third section 30c in FIG. 5 differs from other drawings to facilitate illustration. The primary structure 20 of FIG. 5 is bent in the same manner as the first embodiment to form the three-dimensional fiber structure 11 having the same shape as the first embodiment as shown in FIG. 6.

The second embodiment has the following advantages in addition to the advantages (1) to (9) of the first embodiment.

(10) The length of the connection yarns 13 inserted in the second sections 30b corresponding to the inclined plates 15b during the connection yarn inserting process is set to satisfy the relationship represented by the equation $t/L=\cos(\tan^{-1}\theta)$. The length of the connection yarns 13 inserted in the first sections 30a corresponding to the flanges 15a and the third section 30c corresponding to the top plate 15c is set equal to the thickness t of the fiber lamination 12 at the flanges 15a or the top plate 15c.

Therefore, part of the connection yarns 13 inserted in the flanges 15a or the top plate 15c is prevented from becoming loose after the bending process.

The present invention is not limited to the above embodiments but may be modified as follows.

The fiber lamination 12 does not need to have the structure in which the 0-degree fiber layers 12a and the 90-degree fiber layers 12b are alternately laminated. The fiber lamination 12 may have any structure as long as the fiber lamination 12 has fiber layers formed of the continuous fibers that are laminated and at least biaxially oriented. For example, the fiber lamination 12 may be configured such that the fibers are oriented quadraxially. In this case, the quadraxially oriented fiber lamination 12 includes first bias fiber layers formed of continuous fibers having an arrangement angle of +45°, that is, first bias fibers, and second bias fiber layers formed of second bias fibers having an arrangement angle of −45°, the 0-degree fiber layers 12a formed of the first continuous fibers 16a having an arrangement angle of 0°, and the 90-degree fiber layers 12b formed of the second continuous fibers 16b having an arrangement angle of 90°.

The fiber lamination 12 may be triaxially oriented. In this case, the triaxially oriented fiber lamination 12 includes the first continuous fibers 16a having an arrangement angle of 0°, the first bias fiber layers, and the second bias fiber layers. Alternatively, the triaxially oriented fiber lamination 12 includes the second continuous fibers 16b having an arrangement angle of 90°, the first bias fiber layers, and the second bias fiber layers.

The fiber layers 12a, 12b of the fiber lamination 12 do not need to be laminated alternately in different arrangement angles. The fiber lamination 12 may include a section where the fiber layers formed of the continuous fibers having the same arrangement angle are continuously laminated.

The fiber layers 12a, 12b of the three-dimensional fiber structure 11 may be formed by fabric textures. That is, the connection yarns 13 may bind the laminated fabrics to form the three-dimensional fiber structure 11. In other words, a method for manufacturing the three-dimensional fiber structure 11 may include, instead of the continuous fiber arranging process, a fabric laminating process, which laminates the fabrics. Other processes, that is, the connection yarn inserting process and the bending process are executed in the same manner.

As the fabric, for example, a plain fabric is used. Alternatively, the fabric may be a multilayer fabric such as a double fabric, a triple fabric, or a reversible fabric. When laminating the fabrics, the fiber lamination 12 is formed in a shorter time as compared to a case where the fiber layers formed of the continuous fibers are laminated.

Figure 7A:
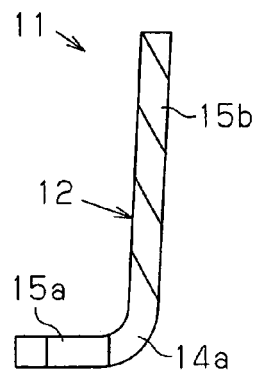
FIG. 7A is a schematic diagram illustrating a three-dimensional fiber structure according to a modified embodiment of the present invention.
Figure 7B:
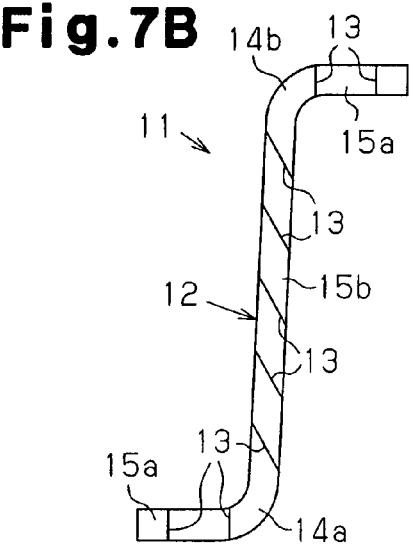
FIG. 7B is a schematic diagram illustrating a three-dimensional fiber structure according to another modified embodiment.

The three-dimensional fiber structure 11 may have an L-shaped cross-section as shown in FIG. 7A, or crank-shaped cross-section as shown in FIG. 7B. The three-dimensional fiber structure 11 shown in FIG. 7A is formed by cutting the three-dimensional fiber structure 11 shown in FIG. 7B at the inclined plate 15b.

The three-dimensional fiber structure 11 shown in FIG. 7A includes a bent portion, and two flat portions. That is, FIG. 7A shows the first bent portion 14a, the flange 15a, and the inclined plate 15b. The three-dimensional fiber structure 11 shown in FIG. 7B includes two bent portions, and three flat portions. That is, FIG. 7B shows the first bent portion 14a, the second bent portion 14b, the flange 15a, the inclined plate 15b, and the top plate 15c.

In the bending process for forming the three-dimensional fiber structure 11 shown in FIG. 7A, in a state where both ends of the primary structure 20 are retained, both ends are relatively displaced while applying tension to the primary structure 20. The three-dimensional fiber structure 11 of FIGS. 7A and 7B is also used as a composite, that is, a reinforcing material of a fiber-reinforced resin.

That is, the three-dimensional fiber structure 11 may have any structure as long as it includes at least a biaxially oriented fiber lamination 12, in which: the bent portion is continuous with the flat portion; the fiber lamination 12 is formed into a three-dimensional plate; of the first flat portion and the second flat portion, which are adjacent to each other with the bent portion located in between, the connection yarns 13 of the first flat portion are arranged to obliquely cross the fiber layer; and the connection yarns 13 of the second flat portion are arranged perpendicular to the fiber layer.

In manufacturing the three-dimensional fiber structure 11 having the L-shaped cross-section shown in FIG. 7A, for example, the bending process may be performed by applying pressure to the primary structure 20 in the thickness direction of the primary structure 20 while securely holding one end of the primary structure 20. In this case, the primary structure 20 is preferably bent along a mold.

That is, the three-dimensional fiber structure 11 shown in FIG. 7A does not need to be manufactured by cutting the three-dimensional fiber structure 11 having the crank-shaped cross-section shown in FIG. 7B at the inclined plate 15b.

Figure 8:
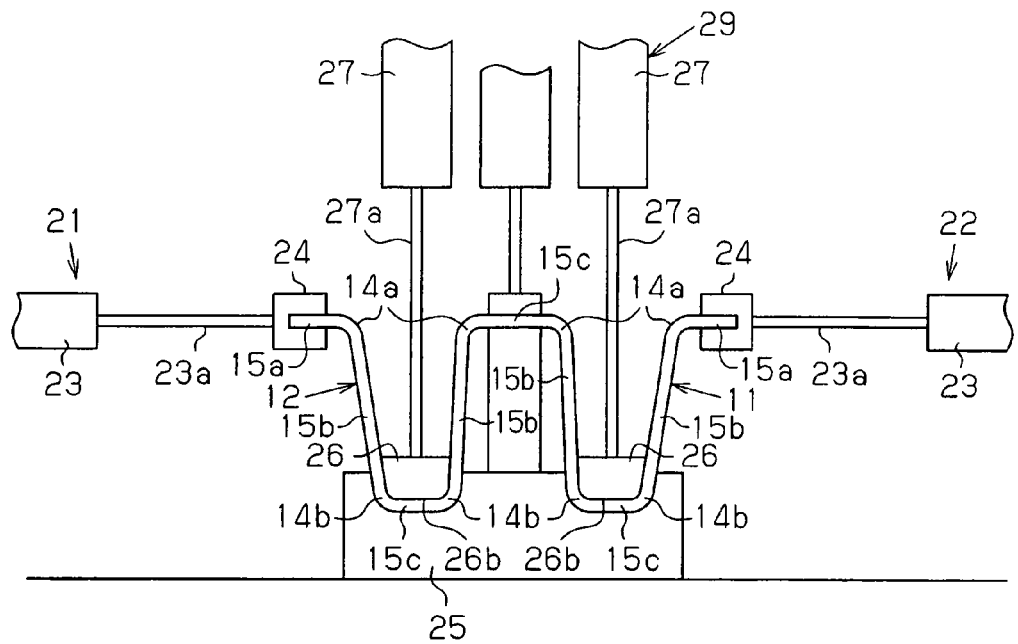
FIG. 8 is a schematic diagram illustrating a manufacturing process of a three-dimensional fiber structure according to another modified embodiment.
Figure 9:
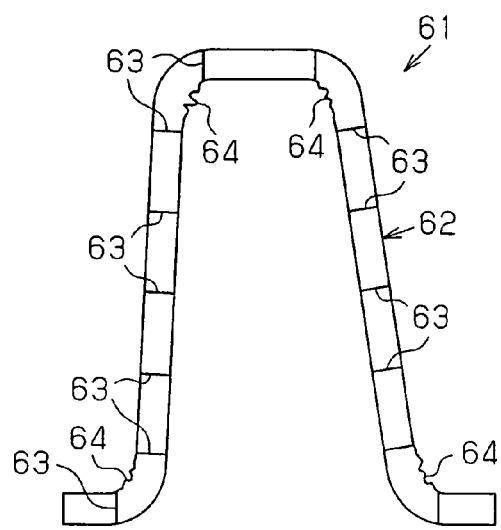
FIG. 9 is a schematic diagram illustrating a general technique for manufacturing a three-dimensional fiber structure.

As shown in FIG. 8, the cross-sectional shape of the three-dimensional fiber structure 11 may have a complex cross-sectional shape such as W-shaped cross-section having two hat-like shapes arranged next to each other. The three-dimensional fiber structure 11 shown in FIG. 8 includes four inclined plates 15b, two flanges 15a, and three top plates 15c. Each of the first bent portions 14a and the associated second bent portion 14b, which are bent in different directions, sandwich the associated inclined plate 15b. Two second bent portions 14b, which are bent in the same direction, sandwich the top plate 15c.

In manufacturing the three-dimensional fiber structure 11 shown in FIG. 8, a fixed base retains the section that will be the top plate 15c at the center. A pair of the clamping devices 21, 22 hold the ends of the primary structure 20. The primary structure 20 is retained in a state where tension is applied within a predetermined range in the horizontal direction.

Two movable molds 26 depress the primary structure 20 downward. The flat portions 26b of the primary structure 20 depressed by the movable molds 26 are displaced without moving relative to the fiber lamination 12. Thus, the cylinders 27 are also displaced in the horizontal direction unlike the first embodiment. The pair of clamp portions 24 move in a direction to approach each other in the same manner as the first embodiment.

The connection yarns 13 of the flanges 15a do not need to be perpendicular to the fiber lamination 12. Likewise, the connection yarns 13 of the top plate 15c do not need to be perpendicular to the fiber lamination 12. The connection yarns 13 of the inclined plates 15b do not need to obliquely cross the fiber lamination 12. The crossing angle of the connection yarns 13 with respect to the fiber lamination 12 may be anything as long as the crossing angle differs between the inclined plates 15b and the flanges 15a. Also, the crossing angle of the connection yarns 13 with respect to the fiber lamination 12 may be anything as long as the crossing angle differs between the inclined plates 15b and the top plate 15c.

The three-dimensional fiber structure 11 may be anything as long as it includes a flat portion and two bent portions, which sandwich the flat portion. The connection yarns 13 of the flat portion are arranged to obliquely cross the fiber layer.

When two bent portions of the three-dimensional fiber structure 11 sandwich the flat portion, for example, the ends of the primary structure 20 may be fixed on a pair of retaining members with an adhesive. The three-dimensional fiber structure 11 may be manufactured by relatively moving the retaining members. That is, the method for manufacturing the three-dimensional fiber structure 11 is not limited to the method in which after two bent portions and three flat portions are alternately arranged, the flat portions on both ends are removed.

The cross-sectional shape of the three-dimensional fiber structure 11 along a plane that simultaneously intersects the bent portions 14a, 14b and the flat portions (15a to 15c) does not necessarily have a constant size. The size of the cross-sectional shape of the three-dimensional fiber structure 11 may gradually increase or decrease from one end to the other end.

More specifically, in the cross-sectional shape of the fiber lamination 12 along an imaginary plane where the continuous fibers are arranged over the bent portions and the flat portions, the length of the first outline on one side of the thickness direction is preferably equal to the length of the second outline on the other side. In this case, when bending the fiber lamination 12 bound by the connection yarns 13, the continuous fibers are smoothly displaced. Thus, the three-dimensional fiber structure 11 is manufactured while suppressing generation of wrinkles and distortion in the bent portions.

Assume that the angle between the thickness direction of the flat portions (15a to 15c), which are adjacent to the bent portions 14a, 14b, and the connection yarns 13 is represented by Φ. Assume that the angle of the bent portions 14a, 14b is represented by θ (radian). The three-dimensional fiber structure 11 may be configured to satisfy the equation θ=tan Φ. In this case, the angle between each inclined plate 15b and the top plate 15c is easily approximated to 90°.

Assume that the angle of the bent portions 14a, 14b is θ (radian), the thickness of the fiber lamination 12 is t, and the length of the connection yarns 13 arranged in the inclined plates 15b is L. The insertion length of the connection yarns 13 during the connection yarn inserting process may be set so as to satisfy the relationship represented by $t/L < \cos(\tan^{-1}\theta)$.

In this case, the tension of the connection yarns 13 arranged in the inclined plates 15b tends to be reduced. However, when the primary structure 20 is bent in the bending process, the connection yarns 13 easily move without hindrance according to displacement of the 90-degree fiber layers 12b located on the outside of the bent portions 14a, 14b. Thus, the bending process is easily performed while preventing generation of wrinkles and distortion in the continuous fibers located inside of the bent portions 14a, 14b.

The continuous fibers configuring the fiber lamination 12 are not limited to the carbon fibers. In accordance with the physical properties required by the three-dimensional fiber structure 11, fibers such as aramid fibers and glass fibers may be used as the continuous fibers.

When the composite includes a reinforcing material formed of the three-dimensional fiber structure 11, the thermosetting resin of the composite is not limited to an epoxy resin. Resin such as an unsaturated polyester resin and a phenol resin may be used for the composite.

When the composite includes a reinforcing material formed of the three-dimensional fiber structure 11, the matrix resin of the composite is not limited to the thermosetting resin, but may be a thermoplastic resin. The laminated fibers are impregnated with the matrix resin, which is the thermoplastic resin, through a common impregnation method such as a melt impregnation method, and then cooled. As a result, the composite is formed. As the thermoplastic resin, for example, nylon, polybutylene terephthalate, or polycarbonate is used.

The invention claimed is:

1. A three-dimensional fiber structure, comprising:
a fiber lamination including a plurality of fiber layers laminated on one another, the fiber layers being at least biaxially oriented, each fiber layer being formed of a continuous fiber or a fabric texture, the fiber lamination being a three-dimensional plate, the fiber lamination including a bent portion, a first flat portion, and a second flat portion, the first flat portion and the second flat portion sandwiching the bent portion, and the first flat portion, the bent portion, and the second flat portion are continuous; and
a connection yarn arranged to cross the fiber layers,
wherein the connection yarn obliquely crosses the fiber layers at the first flat portion, and
wherein the connection yarn is perpendicular to the fiber layers at the second flat portion,
wherein the bent portion defines a centerline of curvature and an imaginary plane that is perpendicular to the centerline of curvature,
wherein the cross-sectional shape of the bent portion at the imaginary plane includes an outer path, which is outside of the bent portion, and an inner path, which is inside of the bent portion,
wherein the cross-sectional shape of the first flat portion at the imaginary plane includes a first flat outline connecting with the outer path of the bent portion, and a second flat outline connecting with the inner path of the bent portion,
wherein an oblique line is defined to be parallel to the connection yarn at the first flat portion and to cross a boundary between the outer path of the bent portion and the first flat outline, the oblique line crossing the second flat outline of the first flat portion at a sliding point,
wherein a length of the outer path of the bent portion is equal to a sum of a length of the inner path of the bent portion and a length of a straight path between the inner path and the sliding portion.

2. A three-dimensional fiber structure, comprising:
a fiber lamination including a plurality of fiber layers laminated on one another, the fiber layers being at least biaxially oriented, each fiber layer being formed of a continuous fiber or a fabric texture, the fiber lamination being a three-dimensional plate, the fiber lamination including a flat portion, a first bent portion, and a second bent portion, the first and second bent portions sandwich the flat portion, and the flat portion and the first and second bent portions are continuous wherein the first bent portion and the second bent portion are bent in different directions; and
a connection yarn arranged to cross the fiber layers, wherein the connection yarn is arranged to obliquely cross the fiber layers at the flat portion,
wherein a representative bent portion, which is one of the first bent portion or the second bent portion defines a centerline of curvature and an imaginary plane that is perpendicular to the centerline of curvature,
wherein the cross-sectional shape of the representative bent portion at the imaginary, plane includes an outer path, which is outside of the representative bent portion, and an inner path, which is inside of the representative bent portion,
wherein the cross-sectional shape of the flat portion at the imaginary plane includes a first flat outline connecting with the outer path of the representative bent portion, and a second flat outline connecting with the inner path of the representative bent portion,
wherein an oblique line is defined to be parallel to the connection yarn at the flat portion and to cross a boundary between the outer path of the representative bent portion and the first flat outline, the oblique line crossing the second flat outline at a sliding point,
wherein a length of the outer path of the representative bent portion is equal to a sum of a length of the inner path of the representative bent portion and a length of a straight path between the inner path of the representative bent portion and the sliding point.

3. The three-dimensional fiber structure according to claim 1,
wherein the bent portion is one of a first bent portion and a second bent portion, wherein the first bent portion and the second bent portion are bent in different directions from each other, the first flat portion is located between the first bent portion and the second bent portion.

4. The three-dimensional fiber structure according to claim 1,
wherein, when viewed from a direction facing the imaginary plane, assuming that the length of the connection yarn that obliquely crosses the fiber layers at the flat portion is represented by L, the bending angle at the bent portion is represented by θ, wherein the angle θ refers to an angle between two straight lines, the two straight lines connecting the center of curvature of the bent portion to the ends of the bent portion, and the thickness of the fiber lamination at the bent portion is represented by t, the relationship $t/L \leqq \cos(\tan^{-1} \theta)$ is satisfied.

5. The three-dimensional fiber structure according to claim 1,
wherein the break elongation percentage of at least one of the continuous fiber and the connection yarn is 2.4% or less.

6. The three-dimensional fiber structure according to claim 1,
wherein, assuming that the angle of the bent portion is represented by θ (radian), wherein the angle θ refers to an angle between two straight lines, the two straight lines connecting the center of curvature of the bent portion to the ends of the bent portion, and the angle between the connection yarn and the thickness direction of the flat portion adjacent to the bent portion is represented by φ (radian), θ=tan φ is satisfied.

7. A composite comprising:
a reinforcing material including the three-dimensional fiber structure according to claim 1;
and a resin matrix.

* * * * *